April 18, 1950     I. B. KNORR     2,504,266
LEAF FOR FISHING FLY BOOKS
Filed Nov. 13, 1946

INVENTOR.
IRVIN B. KNORR
BY Martin E. Anderson
ATTORNEY

Patented Apr. 18, 1950

2,504,266

UNITED STATES PATENT OFFICE 2,504,266

LEAF FOR FISHING FLY BOOKS

Irvin B. Knorr, Colorado Springs, Colo.

Application November 13, 1946, Serial No. 709,569

3 Claims. (Cl. 43—57.5)

This invention relates to improvements in leaves for fishing fly books.

Fishermen, as is well known, must carry an assortment of fishing flies so as to be in position to adapt their tackle to the various conditions under which they are fishing.

Fishing flies are quite sensitive and it is necessary that they be supported in such a manner that the wings will not crush during transportation and one of the objects of this invention is to produce a leaf for a fishing fly book which shall be of such construction that the fishing flies are not subjected to any pressure when not in use.

Another object of this invention is to produce a fishing fly book leaf of such construction that the hooks and flies cannot accidentally become loose and drop out of the case or the book.

A further object of the invention is to produce a fishing fly leaf in which each fly or hook is held individually and in full view.

A still further object is to produce a fly book leaf of such construction that the flies and hooks may be easily attached and removed.

And a further object is to produce a leaf for a fly book of such a construction that snelled hooks are held in such a manner that the gut does not protrude from the book.

A still further object of the invention is to produce a tensioning element of an improved construction comprising a plurality of springs independently supported in such a way that they will not interfere with each other and in which they will be held in a predetermined relation.

The above and other objects that may become apparent as this description proceeds are attained by means of a construction and an arrangement of parts that will now be described in detail and for this purpose reference will be had to the accompanying drawing in which the invention has been illustrated in its preferred form, and in which.

Figure 1:
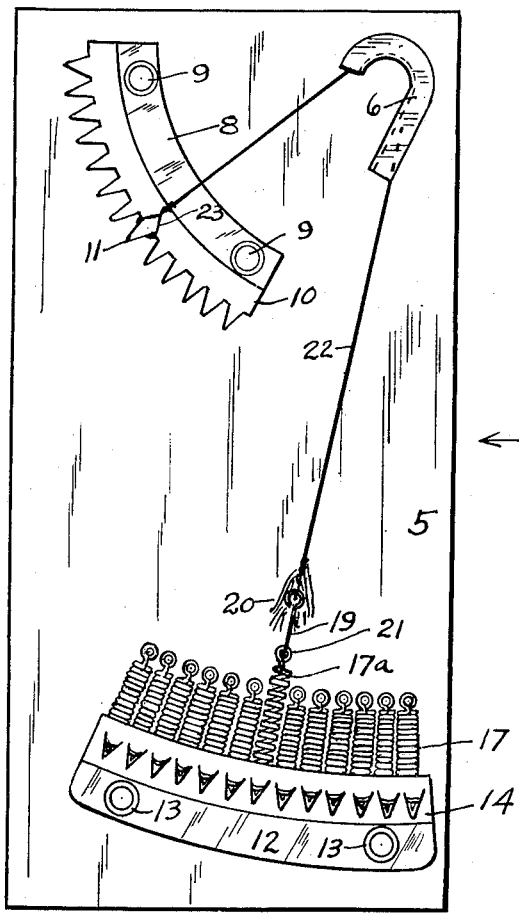
Figure 1 is a plane view of a fishing fly book leaf showing one hook in position thereon.

In the drawing reference numberal 5 designates a leaf which may be made from any suitable material such, for example, as aluminum, pressed board, sheet plastic, hard rubber or any other material that may be deemed suitable for the purpose.

In the embodiment illustrated, the leaf has been shown as rectangular and for the purposes of this description reference will be had to various parts of the leaf, such as the upper end and upper righthand corner, but it is to be understood that the invention is not limited to a rectangular leaf.

Figure 2:
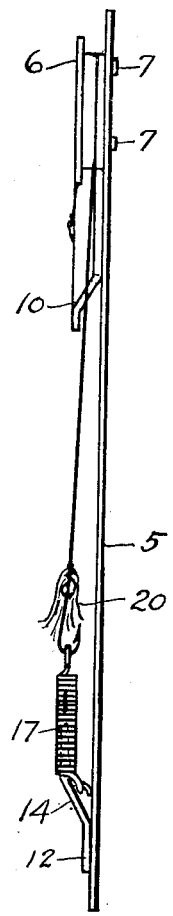
Figure 2 is a side elevation looking in the direction of arrow 2, Figure 1.
Figure 3:
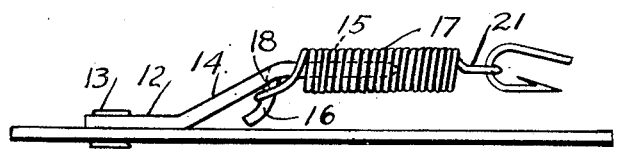
Figure 3 is a fragmentary side elevation to an enlarged scale showing the manner in which the springs are attached to the leaf.

Secured to the leaf 5 is a guide member which has been designated by reference numeral 6. This has a substantial L-shaped cross section and is secured to the leaf by suitable means such as prongs 7 that extend through openings in the leaf and are riveted and hold the anchor in a predetermined position. In the embodiment shown this guide member is positioned at the upper righthand corner. Attached to the leaf near the upper lefthand corner is an anchor plate comprising an arcuate segment 8 that is secured to the leaf by means of grommets or hollow rivets 9. The anchor plate is curved upwardly so as to have an inclined surface 10 that terminates in a number of teeth 11, providing a serrated edge as shown in the drawing. Attached to the leaf near the lower end thereof is a tensioning element comprising a plate 12 that is secured to the leaf by hollow rivets 13, or in any other suitable way. This plate is provided with an inclined surface 14 that terminates in a number of spaced tongues 15 that are best shown in Figure 3. The inclined surface 14 has a tongue 16 of triangular shape, punched loose along two sides and bent downwardly into the position shown in Figure 3. There is one such tongue for each projection 15. Closely coiled helical springs 17 are positioned over the projections 15 and one end coil, which has been designated by reference numeral 18, in Figure 3, is positioned to encircle the tongue 16. This anchors the springs to plate 12 in a manner quite clearly apparent from Figure 3. The end coil at the free end of the spring is bent outwardly so as to lie in a plane parallel with the axis of the spring. It will be apparent that by means of tongues 15, the springs are held in a predetermined spaced relation and maintain a definite position relative to each other at all times. Each spring can be tensioned individually in a manner indicated in Figure 1 where spring 17a has been shown in extended or tensioned position. The hook 19 that may, or may not, have attached to it a fly 20 is inserted in loop 21 at the end of spring 17a and the leader 22 is placed over the guide 6 having its loop 23 positioned around one of the teeth 11. The hook with the leader now occupies the position shown in the drawing and it will be seen that if the hook is provided with a fly, the latter does not come in contact with the leaf 5, but is spaced some distance from it as shown in Figure 2. The capacity of the leaf is determined by the number of springs and the number of teeth 11 on the anchor plate. In the present embodiment there has been provided means for holding thirteen separate hooks and leaders.

Particular attention is called to the construction of the tensioning element comprising plate 12 with its associated springs and more particularly to the use of tongues 15 to hold the springs in a predetermined position. This prevents the springs from moving around when not in use and gives the device a very neat appearance.

Attention is also called to the fact that with this device the hooks may be easily attached and separated, each one being accessible independently from the others. With the construction shown and described, the leaders are always under some tension and are anchored so that they do not project from the book as is quite common in connection with many other similar devices.

Having described the invention what is claimed as new is:

1. An anchoring device for use with a fly book leaf comprising a metal sheet having portions along opposite edges offset so as to lie in different planes, the offset portion adjacent one edge adapted to be secured to the leaf, the other edge having a plurality of spaced tongues, a helical tension spring surrounding each tongue, means for anchoring the springs, comprising tongues integral with the material of the sheet that connects the offset edge portions, said tongues extending through the adjacent end coils of the springs, the other end of the springs having loops for receiving fishhooks.

2. An anchoring device for use with fly book leaves, comprising a narrow metal sheet of arcuate shape having narrow zones adjacent its edges offset so as to lie in spaced parallel planes, the zone adjacent the convex edge being perforated so that it may be fastened to a fly book leaf, the zone along the concave edge having a plurality of spaced tongues, helical springs threaded onto the tongues, whereby they will remain in predetermined spaced relation at all times, the outer ends of the springs having loops for the reception of fish hooks, and means for anchoring the inner ends of the springs to the metal sheet.

3. The improvement for use with a fly book leaf which comprises; a tensioning device adapted to engage said hooks, said device comprising an elongated plate member having a web portion upstanding from said fly leaf, a flat portion joined to said web portion at one longitudinal edge thereof extending in one direction and adapted to be secured to said fly leaf, another portion joined to said web portion at the opposite longitudinal edge thereof and extending in an opposite direction, whereby an open side channel is formed between portions of said elongated plate member and said fly leaf, a plurality of elongated coil springs disposed in parallel relation to said fly leaf and transverse to said elongated plate, loops on the ends of said springs, and means within said channel for securing the spring loops of one end of the springs to the elongated member, the loops on the other ends of said springs being adapted to engage said hooks.

IRVIN B. KNORR.

REFERENCES CITED

The following references are of record in the file of this patent:

UNITED STATES PATENTS

| Number | Name | Date |
|---|---|---|
| 367,020 | Barlow | July 26, 1887 |
| 1,490,370 | Figley | Apr. 15, 1924 |
| 1,737,450 | Burch et al. | Nov. 26, 1929 |